Aug. 18, 1931.   A. E. GREENE   1,819,239

ELECTRIC SMELTING APPARATUS AND PROCESS

Filed June 1, 1925   3 Sheets-Sheet 1

INVENTOR

INVENTOR

Aug. 18, 1931.  A. E. GREENE  1,819,239
ELECTRIC SMELTING APPARATUS AND PROCESS
Filed June 1, 1925   3 Sheets-Sheet 3

INVENTOR

Patented Aug. 18, 1931

1,819,239

UNITED STATES PATENT OFFICE

ALBERT E. GREENE, OF MEDINA, WASHINGTON

ELECTRIC SMELTING APPARATUS AND PROCESS

Application filed June 1, 1925. Serial No. 34,041.

My present invention relates to a new and advantageous process of reducing and smelting ores and to apparatus in which this process may be carried out.

My process is one for the continuous heating and reduction of metal ores and may be applied for the metallurgical treatment of metals or their ores. One of the more important uses of my process is for the reduction of iron ore in a simple and continuous manner and certain details of my improvement relate to the refining of the metal and to the metallurgical details of the treatment whereby the quality of the metal may be controlled.

My present invention is a continuation in part of my application for patent Serial No. 726,541 filed July 17, 1924.

Many efforts to reduce iron ore in a continuous process either to iron or steel have been made but as far as I am now aware none of these have resulted in a practical commercial process.

My invention broadly consists in the method of metallurgical treatment whereby a mixture of ore and other agents is dropped on top of a molten bath on which the reduction of the oxide of the ore by means of a reducing agent entering with it is accomplished under controlled temperature and reducing conditions.

My invention consists in the following steps in one modification or one application of it,—namely, in crushing the ore and mixing it with coal as reducing agent together with any necessary flux such as limestone; feeding the mixed charge into a preheating furnace such as a rotary kiln in which heating and more or less reduction takes place, heat being supplied by combustion of gas from the next step of the process; next passing the charge from the preheating furnace into a smelting chamber where it is heated and reduced and melted and caused to separate into metal and slag during its passage thru this chamber, the reduced metal collecting in the molten bath on the hearth of this smelting chamber and slag being tapped or run out of the chamber at a place away from the incoming charge so that reduction may have been accomplished to the desired extent.

My invention is not limited to use of the preheating chamber except in certain modifications. The several steps of the process may be modified in a number of ways some of which are described hereafter in this specification to show how the invention may be carried out.

My invention is based on the following discoveries. I have found that a charge of crushed or ground ore mixed with a sufficient amount of coal in suitably fine form can be preheated and partly reduced in a chamber for that purpose and then dropped on top of a bath of molten metal and its reduction and melting completed there as it passes thru the smelting chamber. I have found that its passage thru the smelting chamber may be aided by means of movement of the furnace. I have also found that by dropping the charge on the molten bath at one end of the smelting chamber it can be reduced and melted and separated into metal and slag in a continuous, simple manner by proper application of heat to the pile of charge at the inlet end of the smelting chamber, so that the pile spreads out while reduction goes on and by the time the slag reaches a far end of the chamber it can be sufficiently reduced and freed from metal that it may be tapped and removed from the smelting chamber. I have discovered that presence of fine coal or carbon in the charge materially assists the process of separating metal and slag materials and in certain cases I maintain quite an excess of coal. I have also discovered that I am able to combine combustion heat and electric heat in a very advantageous manner so as to maintain relatively high temperatures in the smelting chamber without an excessive draft thru the chamber to speed up the burning of the fuel, and I am thereby able to burn fuel, for example the gas from the reactions together with volatile gas from the fuel and utilize this heat within the smelting chamber. I have also discovered that I may add coal or other fuel in the smelting chamber to take advantage of the combustion heat, and in case of coal or fuel having more or less ash I am able to charge this directly on the molten bath or charge whereby the ash melts finally and is removed along with the slag in a simple and economical manner.

Among other things I also discovered that I get certain new and advantageous effects when I add coal directly into the zone of influence of the electric arc at one end of a reverberatory smelting furnace, where the coal is charged on top of the bath or charge. This effect has to do with the volatilization of the ingredients of the coal. The effect of the high temperature of the arc is to drive off the volatile matter and break up the coal so that combustion, whether to $CO$ or to that and $CO_2$ is accomplished; and a further effect is that by means of the influence of the arc on low grade coal with considerable ash in it, such coal can be used to great advantage, whereas it was thought of little value heretofore.

I also discovered that I could reduce metals such as iron from an oxide ore containing it, which ore also contained considerable phosphorus, and that I could form a slag during the smelting process in which the phosphorus could be held and that in the operation I was able to reduce the iron without reduction of the phosphorus; and I found that even tho I used considerably more coal than was needed to provide carbon or other reducing agent for the oxygen of the ore, yet I was still able to reduce the iron oxide but hold the phosphorus in the slag away from the reduced metal; and I found it aided this operation to adjust the amount of coal so that it did not entirely reduce the iron oxide in the charge, so that the slag contained iron oxide and also lime which I added as a flux or slag making element to help hold the phosphorus compound.

I also discovered that when I charged a mixture of fine iron ore and coal together in a pile on a bath of molten material at one end of a reverberatory smelting chamber, there resulted a kind of disturbance of the pile of charge having the appearance of a trembling of the surface, and I attribute this to the formation of gas within this pile due to the combination of the reducing agents with the oxygen of the ore. At any rate I discovered that the pile had a tendency to move and I attribute this tendency in part to the formation of gas within it and to the presence of considerable coal or carbonaceous material, as well as to the tendency of the pile to flatten out due to the weight on top.

I also discovered that I was able to operate my process at relatively low temperatures and I mean by such relatively low temperatures that they were less than those in the arc or in front of the tuyères in a blast furnace; but I discovered that no stoppage of the movement of the charge in the pile in the smelting chamber took place even tho the temperature was greater than that at which the same charge would sinter in the rotary furnace. I do not know just why the results are as I discovered them. It may be that the conditions within the pile are different from those in the rotary where less charge may be exposed to the flame—but however that may be—the result may be had by carrying out the process as more fully described hereafter in this specification.

I also discovered that under the conditions which maintain in operating my process I am able to reduce manganese oxide at relatively low temperature so that it will enter the metal bath below; and that I can reduce manganese into a bath of iron in this manner and with almost no loss due to volatilization or vaporization of the manganese such as occurs in the blast furnace; and I attribute this discovery to the relatively low temperature conditions.

I also discovered that in carrying out my process, the mixture of fine oxide ore and coal or other reducing agent which entered one end of an elongated reverberatory furnace on top or above the molten bath, could be made to reduce and move along under the influence of the heat of the flame or gases of combustion passing over this part of the charge, and that I could successfully use electric heat nearer the slag tap end of this chamber to get stronger reducing conditions at that end.

Then I also discovered that when operating at relatively low temperatures, such for example as in the reduction of iron from a high phosphorus ore under conditions where phosphorus remained in the slag unreduced and in combination with iron oxide and lime, that then the iron reduced directly to a very pure iron of relatively high melting point, this melting point being less than the temperature of the molten slag.

I do not limit myself to use of a rocking furnace in order to aid in movement of the smelting charge thru the smelting chamber but by means of the large bath of metal beneath on which the charge drops together with the application of heat on the upper surface of the charge I am able to cause the movement of the pile of charge along in the smelting chamber by reason of the fact that it spreads out as it reduces and melts and any excess of coal or carbonaceous reducing agent aids in this and the pile gradually will disappear if not increased by additional incoming charge. I may charge the ore mixture either continuously or in batches at intervals as the previous pile or batch moves along.

My process is applicable for production of large tonnages and very large furnaces may be used.

I do not limit the use of the process to ores but may use it for the melting and in certain cases the refining of metal, charging the metal charges on top of the bath at one end of the smelting chamber and carrying out the melting and treating process as the charge melts and passes to the far end of the chamber. And I have found that mixing carbonaceous matter like coal or coke assists in this method of treatment.

I have found that the gas formed in the smelting chamber by admission of air into that chamber does not have a serious effect on the electrodes. This fact may be in part due to the high temperature whereby the gas burns largely only to CO and little oxidizing effect is produced. I may use relatively high voltage arcs to minimize the consumption of electrodes and to generate the heat with less electric energy loss; and I may also use induction heating to generate heat within the body of molten metal under the charge.

Then I may carry out the smelting chamber process in at least two modifications, namely: one in which the incoming charge moves in the direction of the gases passing through the smelting chamber; and second, I may cause the incoming charge to enter the smelting chamber at a point away from where the combustion flame is produced so that the gases pass in one direction and the smelting charge passes in another. I may even use a round furnace and drop the charge on one portion of the molten bath and pass the gasses near it and up thru the inlet opening for the incoming charge.

Practically every step of the process may be modified in one or more ways and I will describe some of these later on in this specification.

In the annexed drawings I have shown certain modifications of the apparatus and in order to make the operation clear to those skilled in the art I will now refer to these drawings.

I will now describe the apparatus shown in Figs. 1 to 4 and also the method of operation first with regard to the mechanical operation and later with regard to the metallurgical steps of the process in one modification of my invention.

Figures 1, 2, 3, 4:
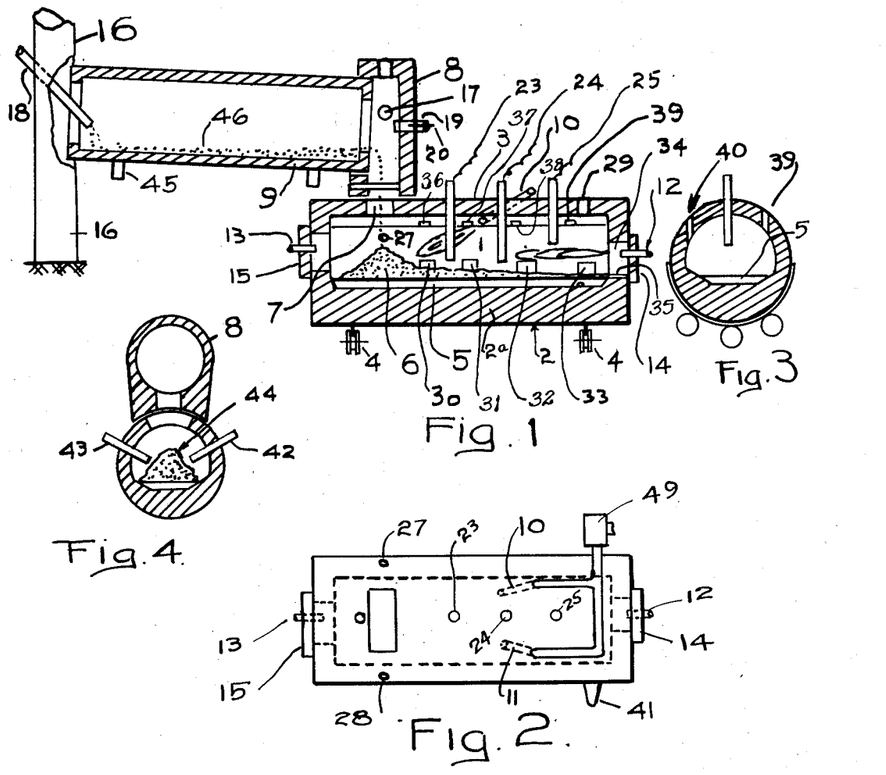
Fig. 1 is an elevation view, in section, of a tilting furnace constituting the smelting furnace, and showing also a rotary preheating furnace and inlet pipe into the rotary hamber thru the stack and also a discharge hamber which serves as a feed head for the charge entering the smelting chamber.
Fig. 2 is a plan view of the main smelting furnace shown in Fig. 1.
Fig. 3 is a sectional elevation view of the slag tap end of the smelting furnace.
Fig. 4 is an elevation view of the other end of the apparatus.

In the apparatus of Figs. 1 and 2 the charge after it enters the smelting chamber moves and spreads out in the direction of the slag tap end of the smelting chamber, while the gases move in the opposite direction and pass up thru the stationary chamber serving to join the rotary kiln and the smelting chamber, and the gas is partly burned in the smelting chamber and more fully burned in the rotary furnace. The main smelting chamber is shown at 1. A metal shell 2 serves as container for the refractory lining forming the smelting chamber. $2^a$ is the hearth lining and 3 is the roof, both shown in section. The shell 2 is mounted on rollers indicated at 4 so that the furnace may tilt or rock, and mechanism may be provided to rock the furnace back and forth thru a suitable arc. The metal bath lying on the hearth is shown at 5. Movement of the furnace back and forth causes the metal level to move,—with respect to the side walls of the chamber and this movement will materially aid in the movement of the charge along in the smelting chamber.

On top of the molten metal 5 is shown a pile of ore charge 6 which has entered thru the opening 7 thru the smelting chamber roof. The rotary kiln is marked 9 and the intermediate chamber connecting the rotary and smelting chamber is marked 8. This intermediate chamber or feed head 8 is stationary and the rotary furnace enters it so that the rotary can rotate and discharge material thru the opening 7 into the smelting chamber, and yet the smelting chamber can rock or tilt back and forth beneath the feed head 8, there being clearance between the head structure and the smelting chamber shell structure.

Air pipes are shown at 10 and 11 entering thru the smelting chamber roof and at 12 thru the door 14 at the slag tap end of the smelting chamber and at 13 thru the door 15 near the inlet end of the smelting chamber.

The gas from the smelting chamber passes up thru the opening 7 and thru the rotary 9 and out the stack 16. An auxiliary stack flue is shown at 17 in the upper part of the feed head 8. A pipe for inlet of charge is shown at 18 entering thru the stack and discharging the ore mixture into the upper end of the rotary.

After the ore has been crushed and suitably ground and mixed with coal and flux as described more particularly later in this specification, it is transferred by suitable conveyor apparatus into the inlet tube 18 and starts its passage thru the preheating furnace or rotary kiln. In this furnace it is heated by combustion of the gas entering thru the opening 7 from the smelting chamber. Air may be admitted thru the pipe 19 which has another fuel pipe 20 within it for auxiliary use. The heated charge from the lower end of the rotary drops thru the opening 7 on top of the molten metal bath 5 in the hearth of the smelting chamber. The pile 6 represents this charge. It contains partly reduced ore and carbon and flux. In the smelting chamber it is acted on by the heat from the combustion flame and also electric heat. A slide 21 or equivalent means is provided when it is desired to collect the material discharging from the rotary so as to drop it in batches on the molten bath below as fast as the previous charge has moved along sufficiently to make room for another charge. However, these details may be modified in various ways, for example by use of screws to continuously feed in the charge from a preheating furnace, and then a separate gas flue may be provided.

I have shown electrodes at 23, 24, and 25 and I may operate any or all of them. I have also shown an electrode hole at 27 and an opposite one at 28 in the plan view of Fig. 2.

At 29 I have shown a coal supply pipe whereby coal may be charged into the slag tap end of the chamber and burned by air admitted to the chamber. The ash from this coal enters the slag and is removed when the slag is tapped.

Small doors for access to the inside of the smelting chamber are shown at 30, 31, 32 and 33. Coal or other material may be charged thru the end door way 34. At 35 I have shown banks of sand for holding back the slag and these may be removed when it is desired to tap the slag. The slag may be tapped thru either end or side door, and doors may be provided on both sides of the furnace chamber. I have also shown openings marked 36, 37, 38 and 39 into the chamber from the part of the roof arch adjoining the side wall. These may be used for repairing the banks of the furnace or for admitting air and may be closed by suitable cover brick.

Fig. 3 shows the arrangement of the slag tap end of the furnace and the blower 49 for forcing air thru the roof pipes is indicated in Fig. 2.

Fig. 4 shows the arrangement of the apparatus at the intake end of the smelting chamber. The electrodes entering thru the side walls are shown here at 42 and 43.

In Fig. 3 may be seen the holes thru the roof at 39 and 40. These may be used for charging material or for repairing the banks of the furnace. A metal tap spout is shown at 41 in Fig. 2. Fig. 3 is a sectional elevation taken thru the hole in the roof at 39 in Fig. 1. Fig. 4 is a sectional elevation of the opposite end of the furnace of Fig. 1 and is taken thru the electrode hole 27 of Fig. 1. Electrodes are shown at 42 and 43 entering thru the side walls of the smelting chamber so that they may make contact with or arc to the charge pile at 44. This is the charge which comes from above thru the feed head 8. The rotary kiln shown at 9 in Fig. 1 is mounted on suitable rollers indicated at 45. The ore charge enters thru the feed pipe 18 which passes thru the stack 16 into the rotary so as to discharge the ore charge into the latter and the ore charge passing thru the rotary is indicated at 46. It will be noted that the course of the charge thru the apparatus in these Figs. 1 to 4 is in the direction opposite to the direction of the combustion gases.

Figure 5:
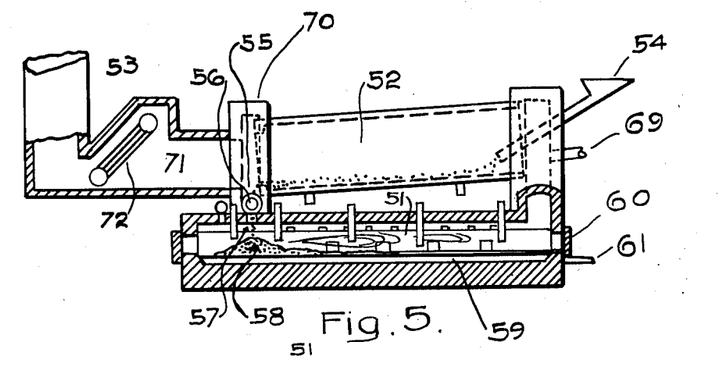
Fig. 5 is a sectional elevation view of a smelting furnace of large size and this figure also shows the arrangement of the preheating chamber located above the smelting chamber.
Figure 6:
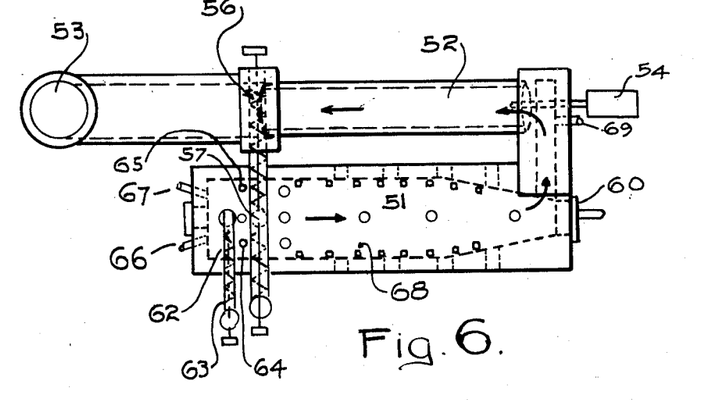
Fig. 6 is a plan view of the furnace of Fig. 5.

Before discussing the metallurgical process I will describe the modification of my invention illustrated in Figs. 5 and 6. These figures represent a relatively large installation and include a main smelting chamber 51 and a preheating furnace 52 and a stack 53. Fig. 6 is a plan view of the apparatus and Fig. 5 is a sectional elevation thru the center line of the smelting chamber 51 of Fig. 6, and shows the rotary preheating furnace in the back ground and the flues and stack partly in section.

One point of difference between the apparatus of Figs. 5 and 6 and the apparatus of the previously described figures is that the direction of charge movement and of gas movement is the same in Figs. 5 and 6 now about to be further described. In the plan view of Fig. 6 the arrows indicate the direction of movement of both charge and gas. The movement of the charge is as follows: the charge of ore enters thru the hopper 54 into the rotary chamber 52 and passes thru that chamber by reason of the rotation of the chamber; at the lower end of this chamber 52 the charge drops down into the chamber 55 beneath the end of the rotary kiln and a screw conveyor, indicated diagramamtically at 56 conveys the heated charge over to the smelting chamber and drops the charge thru the roof hole 57 so that it tends to pile up on the metal bath beneath. The pile of ore charge is shown at 58 in the firing end of the smelting chamber. The metal bath is indicated at 59. The movement of the charge within the smelting chamber is in the direction of the slag tap end of that chamber the slag tap door being shown at 60 and a spout 61 may be used. By means of the heating and smelting action in the chamber 51 the charge gradually moves along and flattens out and melts and separates into metal and slag, the metal dropping down into the bath 59 beneath and the slag flowing towards the slag door 60 thru which it is tapped at convenient intervals, or even allowed to flow continuously.

In this chamber 51 the gas begins to form at the inlet or firing end 62. Coal or other reducing agent enters with the ore charge and as the carbon combines with the oxygen of the ore, CO gas is formed. Some formation of gas takes place in the rotary chamber 52 but the main place of gas formation is in the smelting chamber when coal is supplied as for example thru the screw 63. This coal enters the smelting chamber and is burned by admission of air thru the pipes indicated at 64, 65, 66 and 67. The coal drops on the charge or bath beneath. The entering air burns the carbon to CO chiefly. A relatively high temperature is maintained by using the electric energy thru the arcs from the electrodes to the charge. Here is one of the points of difference from previous practice; for whereas the reverberatory type of furnace requires excessive draft in order to maintain high temperatures, I am able by use of the electric heat to maintain these high temperatures quite easily and to readily control conditions in a manner not heretofore possible. By this means I am able to combine the use of cheap fuel and electric energy so as to accomplish the metallurgical control in a remarkable manner.

The preheated and partly reduced charge enters the smelting chamber at 57 and is then highly heated under the influence of combined fuel combustion and electric energy, or either of them which will be most economical. The result is that the charge in the pile 58 reduces rapidly forming metallic iron and slag, and the pile of material moves along in the direction of the slag tap end of the furnace. The volatile matter of the coal burns in a long flame and heats the furnace the full length. Air may be admitted along the smelting chamber either thru the roof holes like those at 68 or thru side doors and air may also be admitted to complete the combustion of the gas in the rotary chamber, this air entering thru the pipe 69.

The burned gas passes out of the rotary and thru the discharge head 70 and into the flue 71, and I have shown here a boiler for using the waste heat in the flue gases. This boiler is indicated diagrammatically at 72. I have shown the furnace of Fig. 1 as mounted on rollers so that it may be tilted or rocked back and forth. I have not shown the furnace of Fig. 5 so mounted. It is understood, however, that the combination of apparatus may be used either way and that either furnace may be made to tilt or rock; and the various details may be combined in various ways without getting away from the essential improvements of my invention.

As reducing agent I may use coal, wood, or other carbonaceous fuel or liquid fuel; and likewise I may use different fuels for generation of combustion heat in the different chambers of the apparatus. I may use powdered coal or oil or lump coal or slack coal.

I may burn the gas from the smelting chamber in the preheater or may, in certain modifications do without the preheater. Instead of a rotary kiln I may use other forms of heating chamber or furnace. I may discharge the preheated ore from the preheating chamber either in batches or continuously into the smelting chamber.

Figures 7, 8:
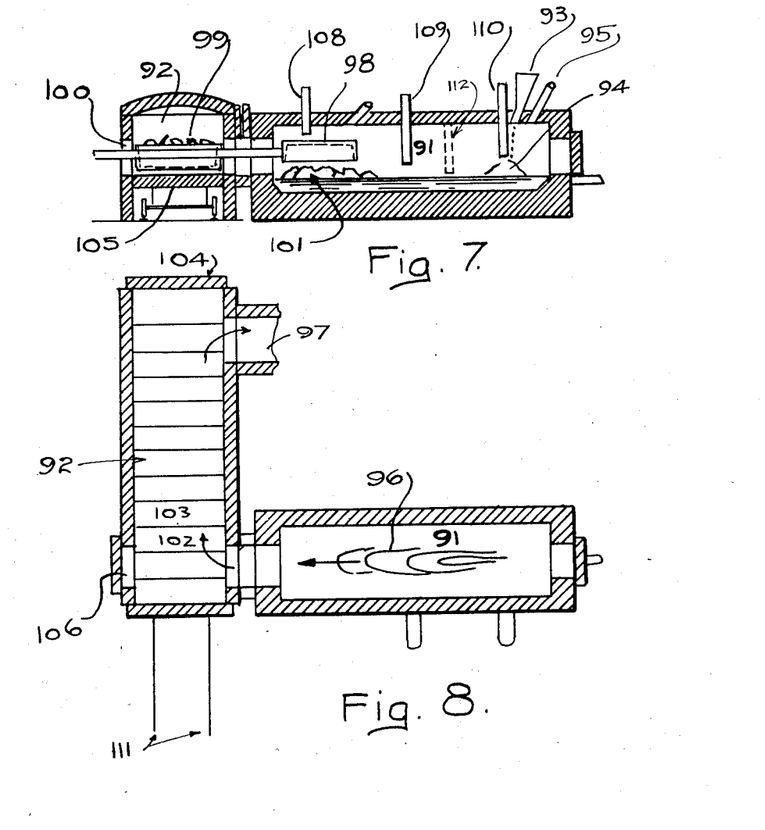
Fig. 7 is a sectional elevation view of a melting chamber furnace together with a preheating car type furnace.
Fig. 8 is a plan view in section of the furnaces shown in Fig. 7.

In Figs. 7 and 8 I have shown a modification of my invention in which, instead of a rotary kiln, I may use a tunnel furnace, or an ordinary car type fuel heating furnace for preheating charge before it enters the melting or smelting chamber. In these figures, the main melting chamber is shown at 91 and the preheating chamber at 92. When fuel is burned it may enter thru a charge pipe 93 and may form a pile 94 on the molten bath below. This coal forms gas by admission of air, for example thru the pipe 95 and the general direction of the combustion flame is shown in Fig. 8 at 96. The arrows show the path of the gas from the melting chamber, then thru the heating chamber 92 and out into the flue 97 to the stack or other place.

These Figs. 7 and 8 also indicate the arrangement and means for melting scrap metal continuously. I have indicated a charging box 98 as being held upside down inside the end of the melting chamber as it would appear after dumping its contents of scrap on top of the molten bath as indicated at 101. The charging machine bar which holds the charging boxes is shown at 100. Back of this bar is shown the scrap in the other boxes in the preheating chamber. The scrap is indicated at 99 as extending up out of the charging boxes. These boxes are indicated further in the plan view of Fig. 8 at 102, 103 and so on to the end 104 of the preheating chamber. This end, 104, may be made movable, for example a door so that the boxes full of scrap may be placed on the car 105 prior to their passage thru the heating chamber. The flame from the melting chamber passes over the top of the charge in the boxes and heats the scrap prior to charging it on the molten bath in the melting chamber. The charging machine bar enters thru the door opening 106. Another door closes the end of the heating furnace at 107 and serves to move the cars or the cars may be moved underneath both the end doors.

These charging boxes may be lined with refractory material so as not to be unduly injured by the heating flame passing above them thru the heating chamber.

Electrodes in the melting chamber are shown at 108, 109 and 110 and these may be used alone or in conjunction with the fuel combustion of the coal entering under the electrode 110. The arc serves to aid in causing the volatile matter of the coal to pass off. It is possible by this means to maintain combustion and at the same time maintain reducing conditions and thereby control the chemical reactions and accomplish the desired end with the most economical mixture of electric and combustion heat. The gas may be completely burned in the heating chamber by admission of air into that chamber.

A track 111 is indicated in Fig. 8 on which the cars may run out of the heating furnace. This arrangement of preheating and melting furnace may be applied to either metal or ore. Likewise, certain kinds of scrap metal similar to cast iron borings may be melted continuously by passing them thru a rotary chamber and then into the melting chamber in an apparatus similar to that shown in the earlier figures in the drawings.

I may in certain modifications advantageously use direct current arcs in combination with the gas heating. The direct current arc is very steady and easily controlled and the intense heat is dispersed thru the furnace by the passage of the gas. I am thus able to use relatively high voltages and long arcs and get increased efficiency. Furthermore the direct current may be generated direct or a synchronous motor may be used to operate the generator and in this way maintain good power factors.

With regard to the metallurgical processes, I may operate in various ways but certain procedures have resulted in marked improvements. By means of the process of this invention I am able to operate continuously at relatively low temperatures. That is, I can control the smelting chamber temperatures so as to easily control and regulate the reducing conditions. In the treatment of iron ore, for example, I am able to reduce the iron oxide to iron but am able to do this with a minimum reduction of silicon from the silica of the charge or slag, even tho reduction is carried on in an acid lined furnace. I am also able to reduce manganese easily from its oxide ores at relatively low temperatures and thus am able to obviate the high vaporization loss of manganese which occurs in the arc type open top reduction furnace heretofore used. In reducing manganese ore I prefer to use a basic lined furnace. I may reduce manganese oxide or oxides such as manganese oxide by adding the oxide on the bath and causing the reduced metal to enter the molten iron below, thus alloying with it. I may do this in either an acid or basic furnace where the oxide, such as manganese oxide is not required in large percentages in the alloy iron or steel. Thus, for example, I may provide 1% or even several percent of manganese in the iron, but where it is desired to reduce manganese ore to produce a relatively high manganese containing metal or alloy, then I prefer to operate with a basic lined furnace because of the relatively basic character of the manganese oxide.

I am also able to reduce the iron of iron ore direct to steel and to keep unreduced certain undesired elements like the silicon and also prevent undesired absorption of carbon into the metal, notwithstanding the fact that I may use a large amount of carbon in the preliminary charge, and considerably more than is required for the reduction of the oxide of iron. I find that I am able to utilize the heat in the coal to excellent advantage and may have the crushed or fine coal come out on top of the slag at the slag end of the process, so that excellent reducing condition can be maintained throughout the operation. Thus I am able to make steel and yet to maintain a reducing slag on top of it with coal or carbonaceous material on top of the slag, and am able to do this without interfering with the continuity of the process.

But I am able to go farther yet and can apply my improvements to the continuous treatment of high phosphorus ore and reduce the iron while separating the phosphorus in a slag and then disposing of it. In such treatment I prefer to use a basic lined furnace, altho I have carried it out in a lining more or less neutral.

In carrying out this process I maintain a relatively low temperature, which is easily possible in my process, and I maintain conditions which are reducing for the iron but I hold the phosphorus in the slag by maintaining the slag strongly basic with lime and with some iron oxide, and I am able to remove the slag at the slag tap end of the furnace and collect the metallic iron in the bath beneath. In certain methods of carrying out this process I may produce a relative high melting point steel and in such case it may be desirable to use induction heating to maintain this molten without unduly heating the upper part of the furnace where the reduction process proceeds. I have separated the phosphorus in the presence of carbon both in the metal and on top of the slag but reducing conditions were not such as to reduce the phosphorus away from its compounds with lime and bases in the slag.

The production of a relatively high melting point iron, referred to above, is due to the fact that under the limited reducing conditions which are maintained, whereby the iron is reduced but the phosphorus and other elements retained as oxides in the slag, due to the presence of some oxide in the slag, then, under such conditions the reduced iron is practically pure iron, and it has a melting point considerably higher than cast iron or even the usual carbon steels. In my co-pending application, Sr. No. 726,541, of which this is a continuation in part, I referred to the fact that the iron reduced may be kept actuatlly below the melting point (P. 10, L. 16—), altho the slag above may of course be molten. The use of a relatively low melting point slag temperature aids in the reduction of the more easily reduced element, in this case iron, and the use of the induction furnace, as above specified provides means of maintaining the high melting point iron just molten without the necessity of maintaining excessive temperatures above the slag by means of the arcing electrodes, for such temperatures would tend to get away from the low-temperature smelting conditions which it is desired to maintain in certain modifications of my process.

I am thus able to accomplish what has, so far as I know, never been accomplished heretofore, namely I can reduce iron ore continuously and separate out undesired elements which it has not been possible to do in the blast furnace or in any other furnace.

My invention may be applied to various uses. Altho I have described it for iron or manganese ore, certain modifications are applicable in various treatments of other ores and metals. One of the advantages of my process in one modification is the continuous step process, of feeding charge into a preheating chamber, thence into a smelting chamber and thru this while the metal is separated from the slag.

The use of carbonaceous material like coal as part of the charge in the manner I have described in this specification is also a great advantage. It was previously supposed that the carbon must be entirely separated from the partly reduced iron or iron oxide which results from the preheating operation in the rotary kiln. But I have found that the excess carbon passing into the smelting or melting chamber is a material advantage in speedy completion of the reduction and in aiding the charge to move along in the smelting chamber.

Another material advantage of my improvement is the combination of gas combustion and electric energy in a way which avoids the necessity of excessive stack draft and in a way which gives easy control over the reducing conditions in the smelting chamber. I am also able to use small amounts of electric energy to advantage by this method.

I have shown a partition or refractory wall in the lower end of the chamber of the furnace of Fig. 7 this wall being indicated by 112. The compartment formed by this wall may be used for melting and reducing special materials into the metal bath, as for example silicon may be added in this compartment and melted by the electric arc or sand with carbon to reduce it may be charged in this chamber and reduced. However, I do not limit my process to reducing silicon in this particular manner, but may reduce it by maintaining sufficiently high temperatures in the charge as it passes thru the smelting chamber proper.

I find that removal of the slag as soon as it has been sufficiently reduced aids the speed of the progress of charge thru the smelting chamber.

I may charge material into the smelting chamber continuously or in batches, but the batches are continuously treated in the smelting chamber.

In order to more fully explain the process as it may be carried out for the reduction of iron ore, for example, I will describe the steps of this operation. The iron ore is assumed to contain say 65% iron (metallic) and 10% silica. The phosphorus and sulphur are sufficiently low so that they need not be removed. The ore is crushed preferably to about 1/16" or finer. Coal is crushed and mixed with the ore so that an intimate mixture is obtained. Lime or limestone is also added in sufficient quantity to form a fluid slag which will flow out of the furnace. The slag as it leaves the furnace might have, for example, 55% of silica and 10 to 15% calcium oxide and also the alumina and similar oxides present in the ore and the coal ash. The apparatus consists of a rotary brick lined preheating chamber and a discharge head and a tilting acid lined electric smelting chamber provided with air pipes for fuel combustion. This apparatus is similar to that shown in Figs. 1 and 2 or 5 and 6. I will select the furnace of the latter type for this example so that the coal enters along with the charge into the smelting chamber and the gases move in the same direction as the charge. The charge is preferably heated to about 900 deg. C. in the preheating chamber but not allowed to sinter and stick to the lining. Partial reduction takes place in this rotary chamber. The material drops on the molten bath in the smelting chamber at high temperature. The proportion of coal in the charge entering the rotary furnace may be as high as 70 pounds of coal per 100 of ore. At any rate an excess of coal may be provided so that coal comes out with the slag—or rather coke from the coal. Reducing conditions are thereby insured thru the length of the smelting chamber. Coal may be charged into the inlet end of the smelting chamber in order to utilize combustion heat more fully. Air is blown in at the same end so that flame forms down the length of the smelting chamber. Electric heat is provided in addition to the combustion heat so that the gas burns mostly to CO. The incoming air combines with the volatile matter of the coal and burns. In large furnaces the heat acting on the incoming ore charge tends to melt and reduce it so that it actually moves along. The charges from the rotary may come either continuously or in intermittent batches, the latter being charged as the pile under the inlet opening has sufficiently moved along to let another charge enter. The electrodes may be placed along the entire length of the furnace but it is often possible to do without certain of these and use the electric heat only where it is most needed but it is understood that I do not limit myself to the way in which the heating is accomplished, except in certain specific modifications of my present invention.

Both coal and charge may be charged thru the side openings of the furnace along its length. The coal in the charge helps to preserve the banks from wear. However these may be repaired when necessary, either while the charge is in the furnace by tipping the furnace so as to get at the worn part of the bank or else by tapping the furnace.

In some cases it is desirable to rock the furnace more or less to aid in movement of the charge thru it. The rocking movement need not be fast. Less than 1 rock per minute has operated satisfactorily.

By the time the slag reaches the tapping end it is light colored and largely freed from iron and may be tapped. The metal collects below.

What I claim is:—

1. In the operation of a smelting furnace combining fuel combustion and electric heating, the process which consists in adding coal in proximity to the electric arc whereby the ingredients of the coal are broken up and subsequently admitting air to burn these ingredients in the same furnace chamber.

2. In the reduction of oxide ore in a reverberatory type smelting furnace, the process which consists in charging a mixture of ore and solid carbonaceous reducing agent at one end of the smelting chamber, heating the charge and causing it to move in the direction towards the other end of the furnace chamber, and causing the flame and combustion gases to pass along thru said chamber in the same direction as the charge as the latter reduces and melts, removal of slag being accomplished at the end opposite the charging end.

3. The improvement in metallurgical operations which comprises passing a charge comprising metallic ore, carbonaceous material and fluxing material successively through a combustion heated zone and an electrically heated zone on the surface of a molten bath in a smelting furnace to effect progressive fusion of the charge and reduction of the ore to form metal and slag, and withdrawing slag from the interior of the furnace at a point remote from the point at which the charge is placed on the surface of the molten bath.

4. The improvement in metallurgical operations which comprises passing a charge comprising iron oxide ore, carbonaceous material and fluxing material successively through a combustion heated zone and an electrically heated zone on the surface of a molten bath in a smelting furnace to effect progressive fusion of the charge and reduction of the ore to form metal and slag, and withdrawing slag from the interior of the furnace at a point remote from the point at which the charge is placed on the surface of the molten bath.

5. The improvement in metallurgical operations which comprises passing a charge comprising manganese ore, carbonaceous material and fluxing material successively through a combustion heated zone and an electrically heated zone on the surface of a molten bath in a smelting furnace to effect progressive fusion of the charge and reduction of the ore to form metal and slag, and withdrawing slag from the interior of the furnace at a point remote from the point at which the charge is placed on the surface of the molten bath.

6. The improvement in metallurgical operations which comprises heating a charge comprising ore, carbonaceous material and fluxing material to a temperature below the sintering point to effect a partial reduction of the ore, placing the heated charge on the surface of a molten bath in a reverberatory furnace adjacent one end thereof, burning carbonaceous material within the furnace to effect fusion of the charge and reduction of the ore and to generate combustible gases withdrawing slag from the interior of the furnace at a point adjacent the end opposite the charging end and burning the combustible gases to heat an additional quantity of charge for introduction into the reverberatory furnace.

7. The improvement in metallurgical operations which comprises heating a charge comprising iron oxide ore, carbonaceous material and fluxing material to a temperature below the sintering point to effect a partial reduction of the ore, placing the heated charge on the surface of a molten bath in a reverberatory furnace adjacent one end thereof, burning carbonaceous material within the furnace to effect fusion of the charge and reduction of the ore and to generate combustible gases, withdrawing slag from the interior of the furnace at a point adjacent the end opposite the charging end, and burning the combustible gases to heat an additional quantity of charge for introduction into the reverberatory furnace.

8. The improvement in metallurgical operations which comprises heating a charge comprising manganese ore, carbonaceous material and fluxing material to a temperature below the sintering point to effect a partial reduction of the ore, placing the heated charge on the surface of a molten bath in a reverberatory furnace adjacent one end thereof, burning carbonaceous material within the furnace to effect fusion of the charge and reduction of the ore and to generate combustible gases, withdrawing slag from the interior of the furnace at a point adjacent the end opposite the charging end, and burning the combustible gases to heat an additional quantity of charge for introduction into the reverberatory furnace.

9. In the reduction of manganese ore in a reverberatory type smelting furnace, the process which comprises charging a mixture of ore and solid carbonaceous reducing agent at one end of the smelting chamber, heating the charge and causing it to move in the direction towards the other end of the furnace chamber, and causing the flame and combustion gases to pass along through said chamber in the same direction as the charge as the latter reduces and melts, removal of slag being accomplished at the end opposite the charging end.

10. In the reduction of iron oxide ore in a reverberatory type smelting furnace, the process which comprises charging a mixture of ore and solid carbonaceous reducing agent at one end of the smelting chamber, heating the charge and causing it to move in the direction towards the other end of the furnace chamber, and causing the flame and combustion gases to pass along through said chamber in the same direction as the charge as the latter reduces and melts, removal of slag being accomplished at the end opposite the charging end.

11. The improvement in metallurgical operations which comprises heating a charge comprising ore, carbonaceous material and fluxing material to a temperature below the sintering point to effect a partial reduction of the ore, placing the heated charge on the surface of a molten bath in a reverberatory furnace adjacent one end thereof, burning carbonaceous material within the furnace adjacent the end opposite the charging end to effect reduction of the ore and fusion of the charge and to generate combustible gases, withdrawing slag from the interior of the furnace at a point adjacent the end opposite the charging end, and burning the combustible gases to heat an additional quantity of charge for introduction into the reverberatory furnace, the combustible gases being withdrawn from the interior of the furnace at a point adjacent the charging end.

In witness whereof, I hereunto subscribe my name this 21st day of May, 1925.

ALBERT E. GREENE.